(12) United States Patent
Pang et al.

(10) Patent No.: US 11,762,265 B1
(45) Date of Patent: Sep. 19, 2023

(54) IMAGING LENS AND PROJECTION DEVICE

(71) Applicant: GUANGZHOU COLORFUL STAGE EQUIPMENT CO., LTD, Guangzhou (CN)

(72) Inventors: Haiquan Pang, Guangzhou (CN); Biao Xia, Guangzhou (CN); Minghua Yang, Guangzhou (CN)

(*) Notice: Subject to any disclaimer, the term of this patent is extended or adjusted under 35 U.S.C. 154(b) by 0 days.

(21) Appl. No.: 18/133,544

(22) Filed: Apr. 12, 2023

(30) Foreign Application Priority Data

Mar. 27, 2023 (CN) .......................... 202310301751.6

(51) Int. Cl.
  *G03B 21/14* (2006.01)
  *G03B 21/20* (2006.01)

(52) U.S. Cl.
  CPC ......... *G03B 21/142* (2013.01); *G03B 21/208* (2013.01); *G03B 21/2013* (2013.01); *G03B 21/2033* (2013.01)

(58) Field of Classification Search
  CPC ...... G02B 3/0068; G02B 3/0081; G02B 3/10; G02B 3/14; G02B 2027/0105–0198; G02B 27/00–648; H04N 9/31–3197; G03B 21/00–64
  See application file for complete search history.

(56) References Cited

U.S. PATENT DOCUMENTS

2010/0079872 A1\* 4/2010 Destain .................... G02B 3/10
359/641

\* cited by examiner

*Primary Examiner* — Bao-Luan Q Le
*Assistant Examiner* — Christopher A Lamb, II

(57) ABSTRACT

An imaging lens and a projection device including the imaging lens are provided. The imaging lens includes a central lens portion and a peripheral lens portion arranged around the central lens portion. The peripheral lens portion has opposite first outer and inner surfaces, at least one of the first outer and inner surfaces has a plurality of first convex regions. The central lens portion has opposite second outer and inner surfaces, and at least one of the second outer and inner surfaces of the central lens portion protrudes beyond the corresponding first outer or inner surface of the peripheral lens portion.

17 Claims, 14 Drawing Sheets

IMAGING LENS AND PROJECTION DEVICE

CROSS-REFERENCE TO RELATED APPLICATIONS

The present application claims priority of Chinese Patent Application No. 202310301751.6, filed on Mar. 27, 2023, the entire contents of which are hereby incorporated by reference.

TECHNICAL FIELD

The present invention relates to the field of optical imaging, in particular to an imaging lens and a projection device.

DESCRIPTION OF THE PRIOR ART

As a decorative projection device, starry sky projection lamp is usually used to project light to the wall or ceiling to form patterns such as stars, moon and the like, creating a quiet, romantic and comfortable atmosphere. The patterns projected by traditional starry sky projection lamps are relatively simple, which is easy to cause aesthetic fatigue. For this reason, some starry sky projection lamps capable of projecting complex patterns (such as aurora) gradually emerge in the market. However, these patterns projected by these starry sky projection lamps are not clear enough, which is a problem that should be solved quickly by those skilled in the art.

SUMMARY OF THE DISCLOSURE

In view of this, the present invention aims to provide an imaging lens and a projection device that can solve the above problems or at least alleviate the above problems.

In one aspect, the present invention provides an imaging lens including a central lens portion and a peripheral lens portion arranged around the central lens portion. The peripheral lens portion has a first outer surface and a first inner surface opposite to each other, and at least one of the first outer surface and the first inner surface has a plurality of first convex regions. The central lens portion has a second outer surface and a second inner surface opposite to each other, and at least one of the second outer surface and the second inner surface of the central lens portion protrudes beyond the corresponding first outer or inner surface of the peripheral lens portion.

On the other hand, the present invention further provides a projection device, which includes a first light-emitting component. The first light-emitting component includes a first light source, a refraction element, a first condenser lens, and a driving source. The refraction element is located between the first light source and the first condenser lens so that light from the first light source can be directed by the refraction element to the first condenser lens when the first light source is powered, and the driving source is configured to drive the refraction element to move. The first condenser lens includes a central lens portion and a peripheral lens portion arranged around the central lens portion. The peripheral lens portion has a first outer surface and a first inner surface opposite to each other, and at least one of the first outer surface and the first inner surface has a plurality of first convex regions. The central lens portion has a second outer surface and a second inner surface opposite to each other, and at least one of the second outer surface and the second inner surface of the central lens portion protrudes beyond the corresponding first outer or inner surface of the peripheral lens portion.

At least one of the second outer surface and the second inner surface of the central lens portion of the imaging lens provided by the present invention protrudes beyond at least one of the first outer surface and the first inner surface of the peripheral lens portion. When the imaging lens is applied to a projection device, the focal length of the lens can be effectively shorten, the magnification of the lens can be increased, the projection area is larger, the imaging distortion is small, and the imaging is clearer.

BRIEF DESCRIPTION OF DRAWINGS

Further features of the invention will become apparent from the following description of preferred embodiments, which are illustrated by way of example only with reference to the accompanying drawings, in which.

DESCRIPTION OF EMBODIMENTS

Figure 1:
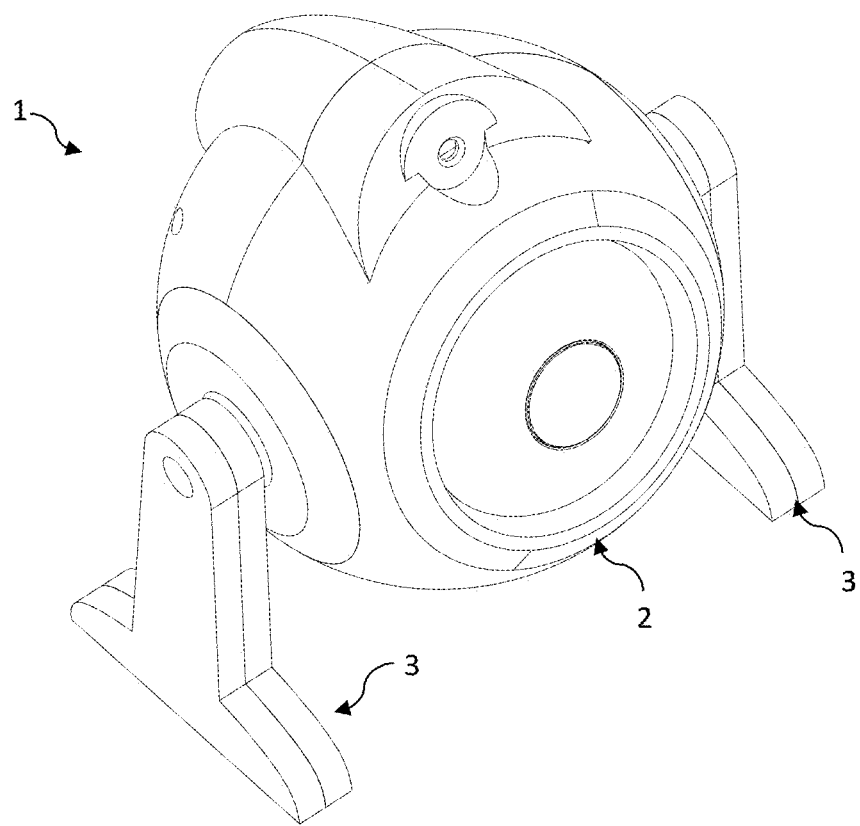
FIG. 1 is a schematic perspective view of a projection device according to a first embodiment of the present invention.

The present invention will be described in detail below in conjunction with the accompanying drawings and specific embodiments, so as to make the technical solution and beneficial effects of the present invention apparent. It can be appreciated that the drawings are only for reference and illustration, and are not intended to limit the present invention. The dimensions shown in the drawings are only for the convenience of clear illustration, without limiting the proportional relationship.

Referring to FIG. 1, a projection device 1 according to a first embodiment of the present invention includes a projection body 2 and at least one leg 3 for supporting the projection body 2. The projection body 2 is rotatably connected to the at least one leg 3 so that the projection body 2 can be rotated to in intended angle as required. In this embodiment, the at least one leg 3 includes two legs 3, and the two legs 3 are respectively rotatably connected to opposite sides of the projection body 2. It can be appreciated that in other embodiments, the at least one leg 3 may include more or less legs, such as one or three legs.

Figure 2:
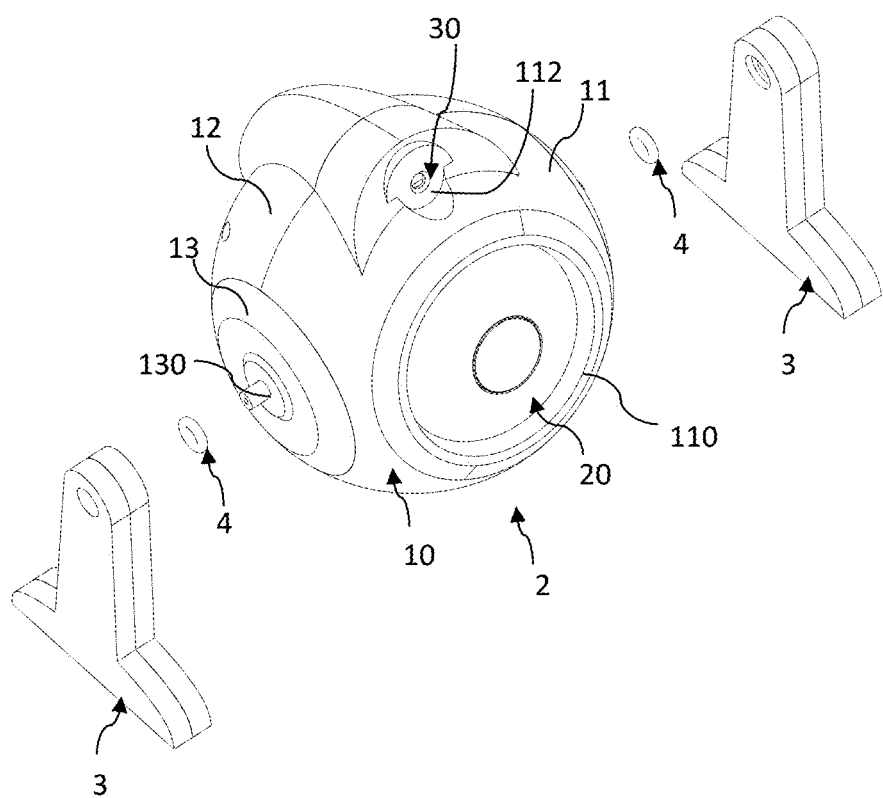
FIG. 2 is an exploded view of the projection device of FIG. 1.

Referring to FIG. 2, preferably, a limiting member 4 is provided between each leg 3 and the projection body 2 for fixing the projection body 2 at the intended angle relative to the leg 3. Optionally, the limiting member 4 is a rubber ring as shown in the figure. It can be appreciated that in other embodiments, the limiting member 4 may uses other mechanisms, such as a spring limiting member or a damper. Optionally, the limiting member 4 can fix the projection body 2 relative to the leg 3 at any angle within the range of 0° to 360°, for example, 330°; or at any angle within the range of 0° to 270°, for example, 240°; or at any angle within the range of 0° to 180°, for example, 120°; or at any angle within the range of 0° to 90°, for example, 60°, 45°, 30°, 15° among others.

Figure 3:
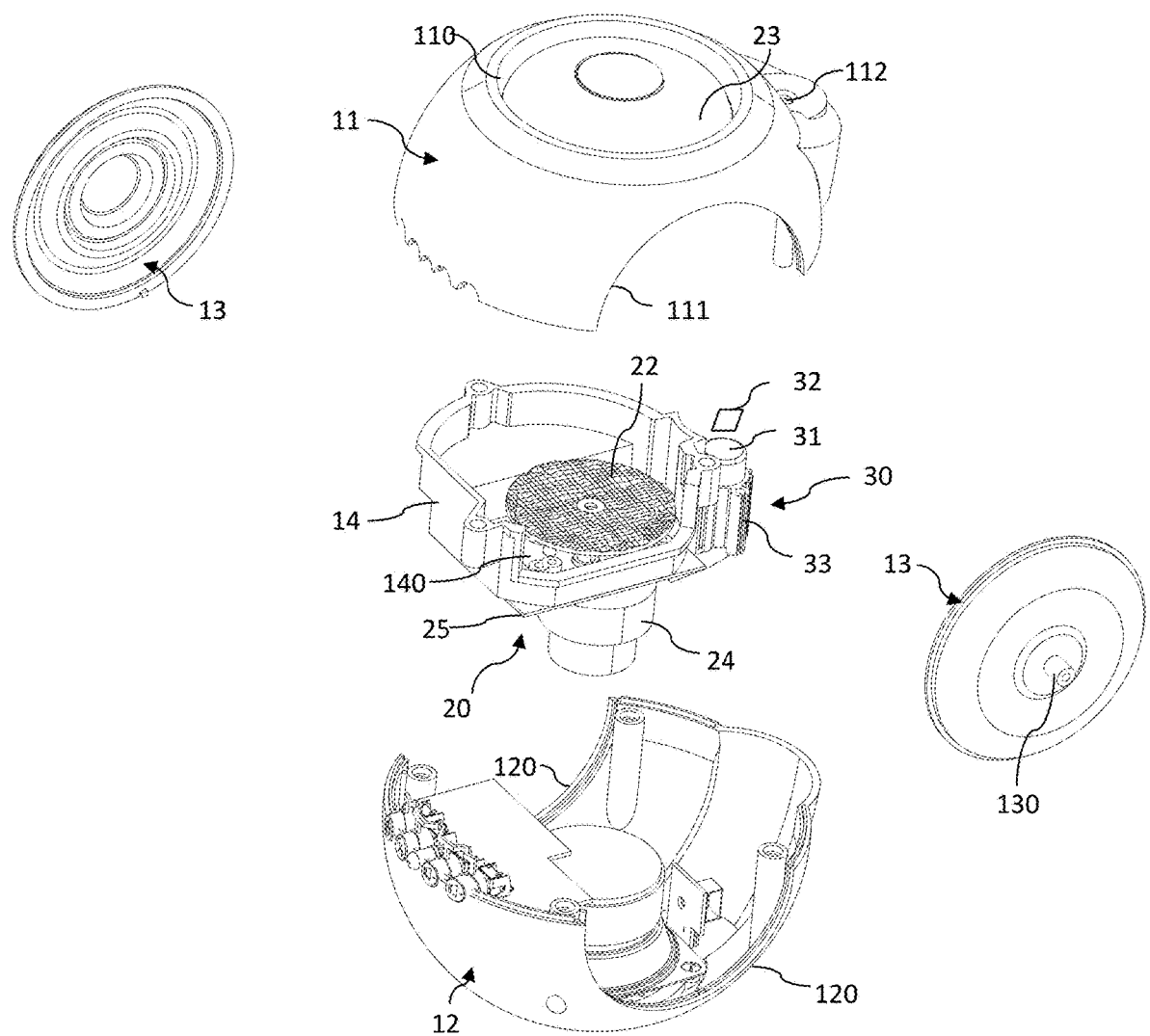
FIG. 3 is an exploded view of a projection body of the projection device of FIG. 2.

Referring to FIG. 2 and FIG. 3, in this embodiment, the projection body 2 is generally spherical and includes a housing 10 and a first light-emitting component 20 accommodated in the housing 10. As an example, rather a limitation, the housing 10 includes a first half shell 11 and a second half shell 12 that are generally hemispherical, respectively, as well as two circular caps 3 arranged on opposite sides of the first half shell 11 and the second half shell 12 respectively. The top side of the first half shell 11 away from the second half shell 12 is provided with a circular first opening 110, and the two opposite sides of the first half shell 11 adjacent to the second half shell 12 are respectively provided with semicircular second openings 111. Two opposite sides of the second half shell 12 adjacent to the first half shell 11 are respectively provided with semicircular third openings 120. The first half shell 11 is snapped with the second half shell 12, and the second opening 111 on each side of the first half shell 11 and the third opening 120 on the corresponding side of the second half shell 12 together form a circular opening, for accommodating a corresponding cap 13. In this embodiment, a connecting shaft 130 is provided on the radially outer side of each cap 13 for passing through the corresponding limiting member 4. It can be appreciated that in other embodiments, the housing 10 may use other configurations.

Figure 4:
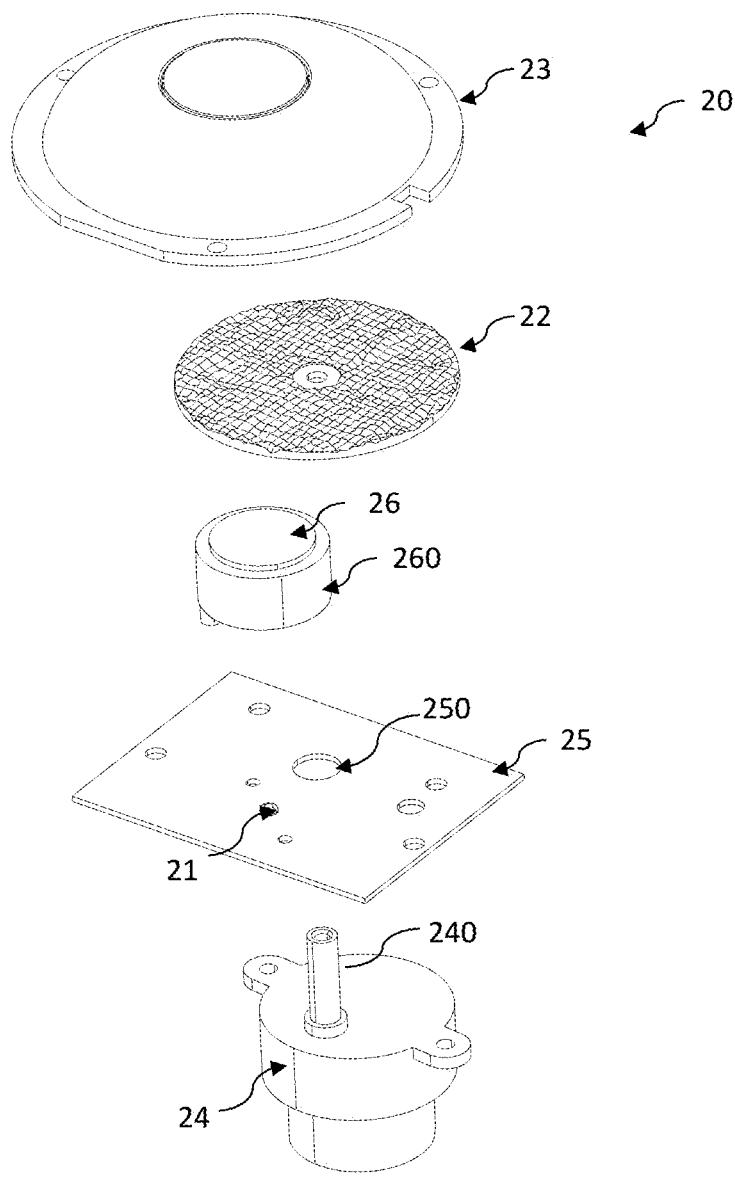
FIG. 4 is an exploded view of a first light-emitting component of the projection body of FIG. 3.

Referring to FIG. 3 and FIG. 4, in this embodiment, the first light-emitting component 20 includes a first light source 21, a refraction element 22, a first condenser lens 23, and a driving source 24. The first light source 21, the refraction element 22, and the driving source 24 are accommodated in the housing 10. The first condenser lens 23 is accommodated in the first opening 110 and protrudes outward relative to the first half shell 11. Optionally, the first condenser lens 23 is fixedly installed on the first half shell 11. The refraction element 22 is located between the first light source 21 and the first condenser lens 23 so that when the first light source 21 is powered, the light from the first light source 21 can be guided to the first condenser lens 23 through the refraction element 22, thereby allowing the light to be emitted to the outside through the first opening 110. The driving source 24 is used to drive the refraction element 22 to move.

Preferably, the central axis of the first light source 21 coincides with or approximately coincides with the central axis of the first condenser lens 23. The refraction element 22 is arranged eccentrically relative to the first light source 21 or the first condenser lens 23, and preferably completely covers the first light source 21 in the axial direction. The first condenser lens 23 preferably completely covers the refractive element 22 in the axial direction.

Optionally, the driving source 24 is a motor, the output shaft 240 of which passes through the middle of the refraction element 22 and is connected to the refraction element 22 to drive the refraction element 22 to rotate. Alternatively, in other embodiments, the driving source 24 can be used to drive the refraction element 22 to make other motions.

Therefore, when the first light source 21 is powered, the light emitted from the first light source 21 is emitted to the first condenser lens 23 through an eccentric portion of the refraction element 22, and since the refraction element 22 is driven by the driving source 24 to rotate, the light emitted from the first light source 21 will continuously pass through the eccentric portions distributed along the circumference of the refraction element 22, and such a process will be repeated along with the repeated circumferential movement of the refraction element 22, so that the light emitted from the first condenser lens 23 presents a dynamically changing pattern.

As an example, in this embodiment, the first light source 21 is an LED bead, which is installed on a substrate 25 for connecting external power supply. The refraction element 22 is arranged on the side of the substrate 25 where the first light source 21 is located, and is located above the first light source 21 at a certain distance. The driving source 24 is installed on the side of the substrate 25 facing away from the first light source 21, and its output shaft 240 passes through a first through hole 250 defined in the substrate 25 and is fixedly connected to the refraction element 22.

For the convenience of the installation of the substrate 25, optionally, a support frame 14 is further provided in the first half shell 11 and the second half shell 12, and the support frame 14 can be fixedly connected with the first half shell 11 and/or the second half shell 12, for example by screws. The substrate 25 is installed on the side of the support frame 14 away from the first half shell 11, and the support frame 14 is provided with a fourth opening 140 to allow the refraction element 22 to be installed at the side of the support frame 14 facing the first half shell 11 and rotate freely.

Optionally, the first light-emitting component 20 further includes a second condenser lens 26. The second condenser lens 26 is located between the first light source 21 and the refraction element 22, and the second condenser lens 26 is positioned so that the light from the first light source 21 can be directed to the refractive element 22 through the second condenser lens 26 when the first light source 21 is powered.

Preferably, the second condenser lens 26, the first light source 21 and the first condenser lens 23 are arranged coaxially, that is, the second condenser lens 26 and the refraction element 22 are arranged eccentrically with each other. Preferably, the refraction element 22 completely covers the second condenser lens 26 in the axial direction. Further preferably, the second condenser lens 26 is arranged on one side away from the central axis of the refraction element 22. More preferably, the diameter of the second condenser lens 26 is equal to or substantially equal to the radius of the refraction element 22. Thus, the light emitted from the first light source 21 will enter the corresponding eccentric portion on one side away from the central axis of the refraction element 22 through the second condenser lens 26, and along with the circumferential movement of the refraction element 22, the light from the first light source 21 will continuously pass through the eccentric portions distributed along the circumference of the refracting element 22 through the second condenser lens 26, that is, every circle the refracting element 22 rotates, the light emitted from the first light source 21 will pass through one circumference of the refraction element 22 through the second condenser lens 26, and such a process will be repeated as the refraction element 22 repeatedly moves in the circumferential direction.

As an example, in this embodiment, the second condenser lens 26 is installed on the substrate 25 through a mounting seat 260. It can be appreciated that, in other embodiments, the second condenser lens 26 can be removed.

Referring to FIG. 2 and FIG. 3 again, optionally, the projection body 2 further includes a second light-emitting component 30. The second light-emitting component 30 includes a second light source 31 and a diffraction element 32, and when the second light source 31 is powered, light from the second light source 31 is directed through the diffraction element 32. Accordingly, the first half shell 11 is further provided with a second through hole 112, so that the light emitted from the diffraction element 32 can be emitted to the outside through the second through hole 112. Preferably, the second light source 31 is a laser, and the diffraction element 32 is a grating sheet. Optionally, the second light-emitting component 30 further includes a laser radiator 33 arranged around the second light source 31. As an example, in this embodiment, the second light-emitting component 30 is also fixed on the support frame 14.

Figure 5:
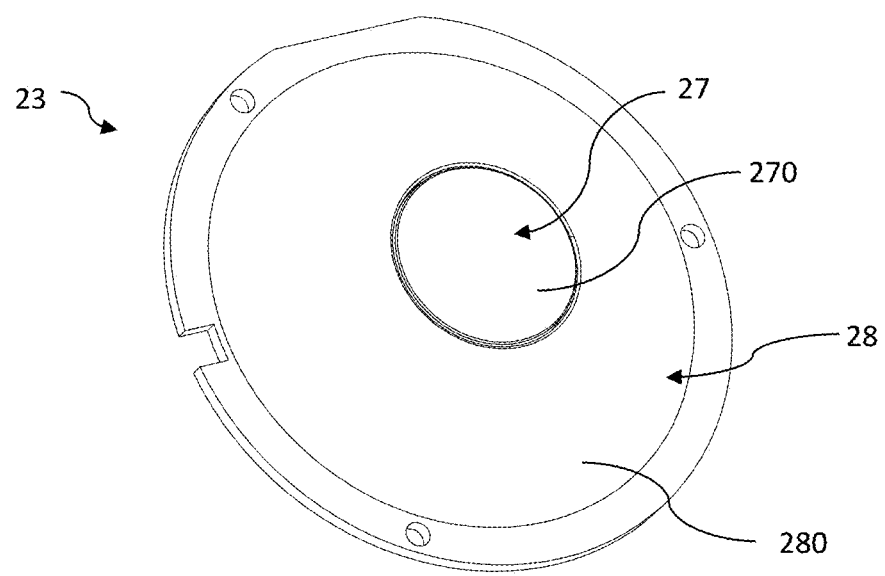
FIG. 5 is a perspective view of a first condenser lens of the first light-emitting component of FIG. 4.
Figure 6:
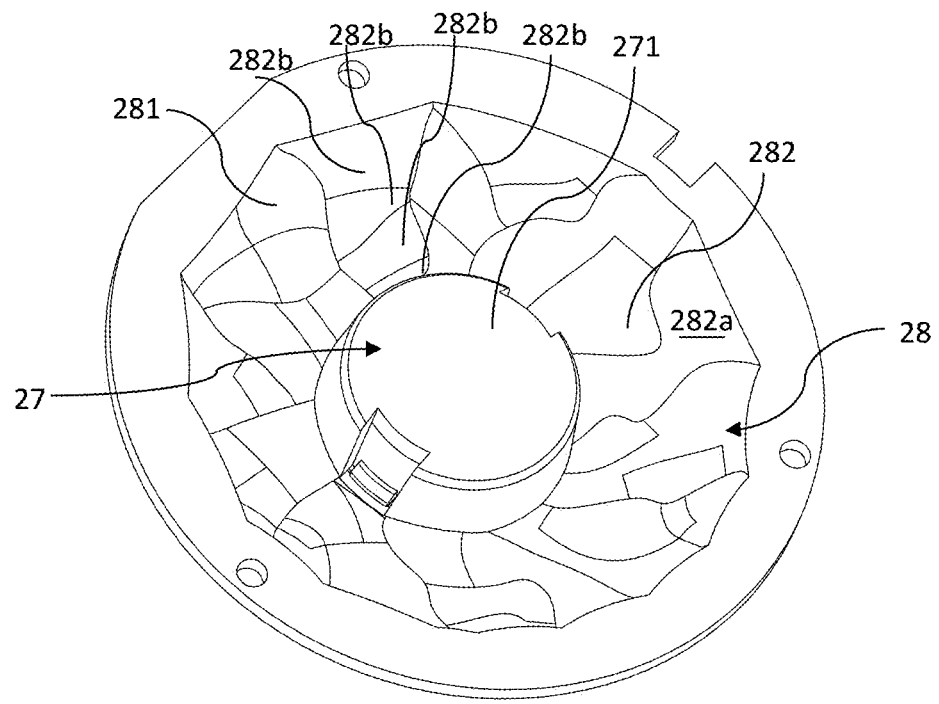
FIG. 6 is another perspective view of the first condenser lens of FIG. 5.

Referring to FIG. 5 and FIG. 6, in this embodiment, the first condenser lens 23 includes a central lens portion 27 and a peripheral lens portion 28 disposed around the periphery of the central lens portion 27. The peripheral lens portion 28 has a first outer surface 280 and a first inner surface 281 opposite to each other, and at least one of the first outer surface 280 and the first inner surface 281 has a plurality of irregular first convex regions 282 for projection into patterns. The central lens portion 27 has a second outer surface 270 and a second inner surface 271 opposite to each other. The second outer surface 270 of the central lens portion 27 protrudes beyond the first outer surface 280 of the peripheral lens portion 28 and/or the second inner surface 271 of the central lens portion 27 protrudes beyond the first inner surface 281 of the peripheral lens portion 28. In other words, at least one of the surfaces 270, 271 of the central lens portion 27 of the first condenser lens 23 in this embodiment protrudes beyond the corresponding surfaces 280, 281 of the peripheral lens portion 28, which effectively shortens the focal length of the lens and improves the magnification of the lens, with larger projection area and small imaging distortion, and the imaging is clearer.

In this embodiment, the plurality of irregular first convex regions 282 are formed on the first inner surface 281 of the peripheral lens portion 28, and the first outer surface 280 of the peripheral lens portion 28 is smooth. Therefore, it can also be considered that in this embodiment, the peripheral lens portion 28 includes a plurality of plano-convex lenses. In other embodiments, the plurality of irregular first convex regions 282 can be formed on the first outer surface 280 of the peripheral lens portion 28 while the first inner surface 281 of the peripheral lens portion 28 is smooth. Alternatively, the plurality of irregular first convex regions 282 can be provided on both the first outer surface 280 of the peripheral lens portion 28 and the first inner surface 281 of the peripheral lens portion 28, that is, the peripheral lens portion 28 can include a plurality of biconvex lens. In other embodiments, additional patterns, such as circular or spiral ground patterns, can be defined on the first outer surface 280 and/or the first inner surface 281 of the peripheral lens portion 28.

In this embodiment, the entire area of the first inner surface 281 of the peripheral lens portion 28 is provided with first convex regions 282. It can be appreciated that, in other embodiments, the first convex regions 282 can be provided on a partial area of the first inner surface 281 of the peripheral lens portion 28, such as 90%, 80%, 70%, 60% or 50%, preferably at least 40%.

Preferably, the number of the plurality of irregular first convex regions 282 is no less than ten. It is further preferred that no less than two-thirds of the plurality of irregular first convex regions 282 are in the shape of irregular strips (not strips strictly required in the geometric sense, provided that the maximum length thereof is greater than the maximum width thereof and the edge of the strip can be a straight line or a curve), wherein the radial inner side of each irregular strip-shaped/elongated first convex region 282 is adjacent to or close to the central lens portion 27, while the radial outer side extends radially outward to the outer periphery of the peripheral lens portion 28, such as the first convex region 282*a* shown in FIG. 6. Preferably, part of the strip-shaped/elongated first convex regions 282 each can be arbitrarily divided into two or more irregular first convex regions, such as the two irregular first convex regions 282*b* shown in FIG. 6. In other words, the strip-shaped/elongated first convex region 282 can be a single strip-shaped/elongated first convex region, or can be a strip-shaped/elongated area formed by a plurality of irregular first convex regions.

Figure 7:
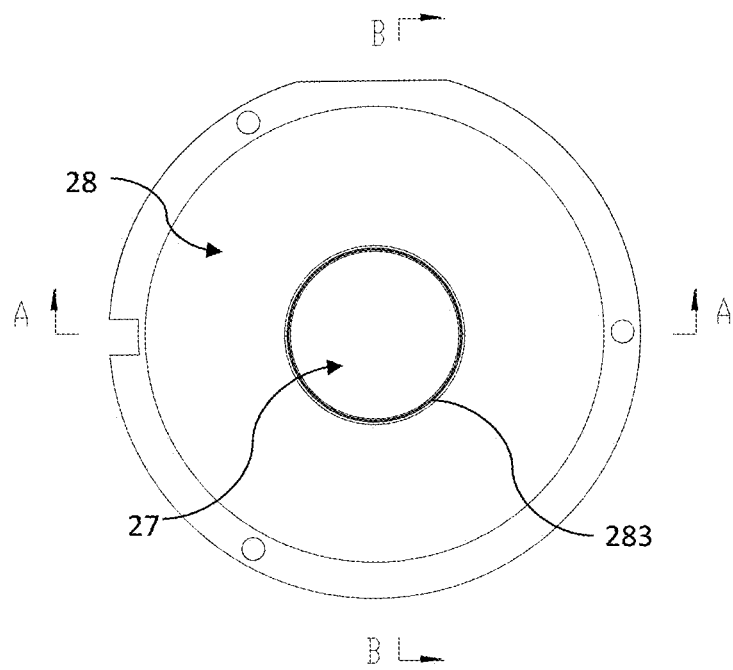
FIG. 7 is a top view of the first condenser lens of FIG. 5.
Figure 8:
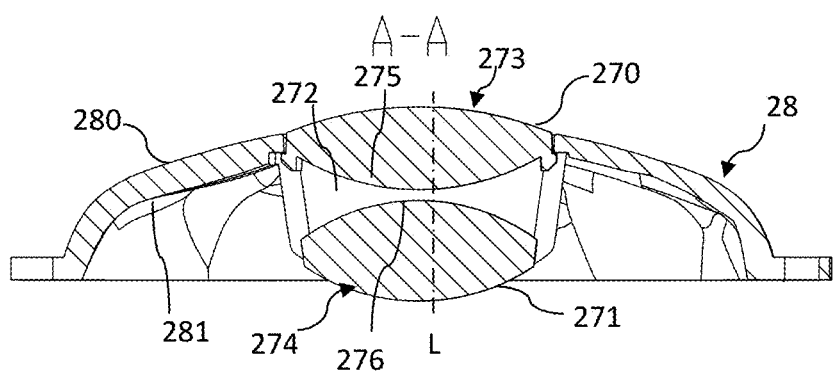
FIG. 8 is a cross-sectional view of the first condenser lens of FIG. 7 in A-A direction.
Figure 9:
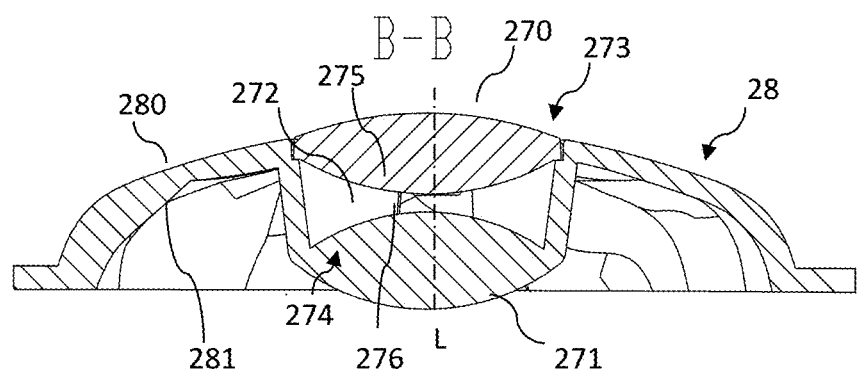
FIG. 9 is a cross-sectional view of the first condenser lens of FIG. 7 in B-B direction.

Referring FIGS. 7 to 9, in this embodiment, the peripheral lens portion 28 is generally ring-shaped in the circumferential direction (that is, the direction around the central axis L of the peripheral lens portion 28), and has a central hole 283 in its center for accommodating the center lens portion 27. The peripheral lens portion 28 is generally arched in the axial direction (along the central axis L of the peripheral lens portion 28), that is, the first inner surface 281 of the peripheral lens portion 28 is concaved towards the first outer surface 280 of the peripheral lens portion 28, while the first outer surface 280 of the peripheral lens portion 28 is convex away from the first inner surface 281 of the peripheral lens portion 28.

In this embodiment, the second outer surface 270 of the central lens portion 27 protrudes beyond the first outer surface 280 of the peripheral lens portion 28 away from the second inner surface 271, and the second inner surface 271 of the central lens portion 27 protrudes beyond the first inner surface 281 of the peripheral lens portion 28 away from the second outer surface 270, and the protrusion height of the second inner surface 271 of the central lens portion 27 relative to the first inner surface 281 of the peripheral lens portion 28 is greater than the protrusion height of the second outer surface 270 of the central lens portion 27 relative to the first outer surface 280 of the peripheral lens portion 28.

In other embodiments, the protrusion height of the second inner surface 271 of the central lens portion 27 relative to the first inner surface 281 of the peripheral lens portion 28 can be smaller than the protrusion height of the second outer surface 270 of the central lens portion 27 relative to the first outer surface 280 of the peripheral lens portion 28. Alternatively, the protrusion height of the second inner surface 271 of the central lens portion 27 relative to the first inner surface 281 of the peripheral lens portion 28 can be equal to the protrusion height of the second outer surface 270 of the central lens portion 27 relative to the first outer surface 280 of the peripheral lens portion 28.

Alternatively, only the second outer surface 270 of the central lens portion 27 protrudes beyond the first outer surface 280 of the peripheral lens portion 28 away from the second inner surface 271, while the second inner surface 271 of the central lens portion 27 is flush or substantially flush with the first inner surface 281 of the peripheral lens portion 28. Alternatively, only the second inner surface 271 of the central lens portion 27 protrudes beyond the first inner surface 281 of the peripheral lens portion 28 away from the second outer surface 270, while the second outer surface 270 of the central lens portion 27 is flush or substantially flush with the first outer surface 280 of the peripheral lens portion 28.

In this embodiment, both the second outer surface 270 and the second inner surface 271 of the central lens portion 27 are smooth. It can be appreciated that, in other embodiments, one or both of the second outer surface 270 and the second inner surface 271 of the central lens portion 27 can be provided with convex regions to form pattern.

Preferably, a transition space 272 is defined between the second outer surface 270 and the second inner surface 271 of the central lens portion 27, which helps to reduce the thickness of the solid material of the central lens portion 27.

Referring to FIGS. 8 to 11, preferably, in this embodiment, the central lens portion 27 includes a first central lens portion 273 and a second central lens portion 274 formed in separate pieces, and the first central lens portion 273 and the second central lens portion 274 are at least partially aligned with each other in the axial direction. The central lens portion 27 with separate pieces is more convenient to manufacture.

Preferably, at least ¼ of the first central lens portion 273 is axially aligned with ¼ of the second central lens portion 274, more preferably, at least ½ of the first central lens portion 273 is aligned with ½ of the second central lens portion 274, further preferably, at least ¾ of the first central lens portion 273 is axially aligned with ¾ of the second central lens portion 274, most preferably, as shown in the figure, the central axis of the first central lens portion 273 coincides with the central axis of the second central lens portion 274.

In this embodiment, the first central lens portion 273 is located above the second central lens portion 274. In other embodiments, the first central lens portion 273 can be located below the second central lens portion 274.

In this embodiment, the surface of the first central lens portion 273 facing away from the second central lens portion 274 is the second outer surface 270 of the central lens portion 27. The surface of the second central lens portion 274 facing away from the first central lens portion 273 is the second inner surface 271 of the central lens portion 27. The transition space 272 is defined between the surface 275 of the first central lens portion 273 facing the second central lens portion 274 and the surface 276 of the second central lens portion 274 facing the first central lens portion 273. It can be appreciated that, in other embodiments, the surface 275 of the first central lens portion 273 and the surface 276 of the second central lens portion 274 can contact each other without the transition space 272.

In this embodiment, the first central lens portion 273 preferably uses a biconvex lens. Similarly, the second central lens portion 274 also preferably uses a biconvex lens. It can be appreciated that in other embodiments, the first central lens portion 273 and/or the second central lens portion 274 can use other structures, such as plano-convex lenses and the like.

In this embodiment, the first central lens portion 273 and the second central lens portion 274 are both circular in the circumferential direction. It can be appreciated that, in other embodiments, the first central lens portion 273 may be in other shapes, such as square. Preferably, the area of the first central lens portion 273 is larger than the area of the second central lens portion 274, which facilitates the imaging of the first central lens portion 273.

In this embodiment, the second central lens portion 274 is connected with the peripheral lens portion 28, preferably the second central lens portion 274 and the peripheral lens portion 28 are formed in one piece. The first central lens portion 273 is adapted to be assembled to the peripheral lens portion 28 and/or the second central lens portion 274. In other words, in the present embodiment, the central lens portion 27 is formed by assembly. It can be appreciated that, in other embodiments, the first central lens portion 273 may not be assembled to the peripheral lens portion 28 and/or the second central lens portion 274, but directly installed above or below the second center lens portion 274 by means of other mounts such as supports. Similarly, in other embodiments, the second central lens portion 274 may not be connected with the peripheral lens portion 28, but installed below or above the first central lens portion 273 by means of other mounts such as supports.

Figure 10:
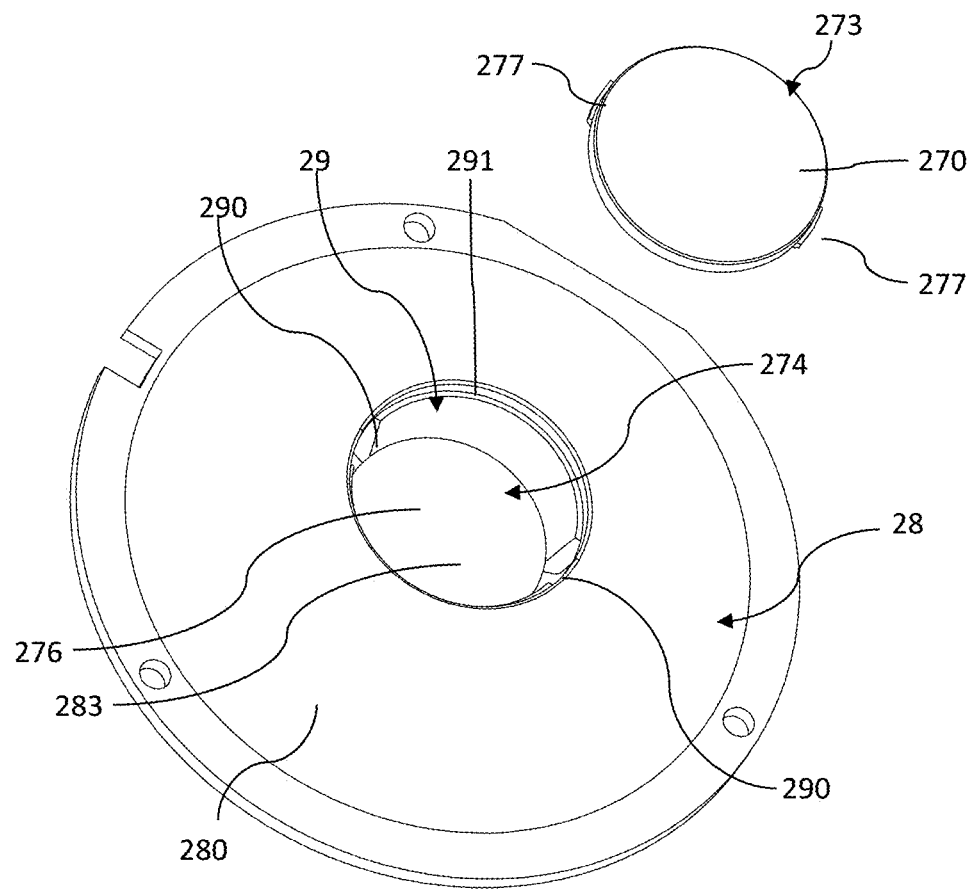
FIG. 10 is an exploded view of the first condenser lens of FIG. 5.
Figure 11:
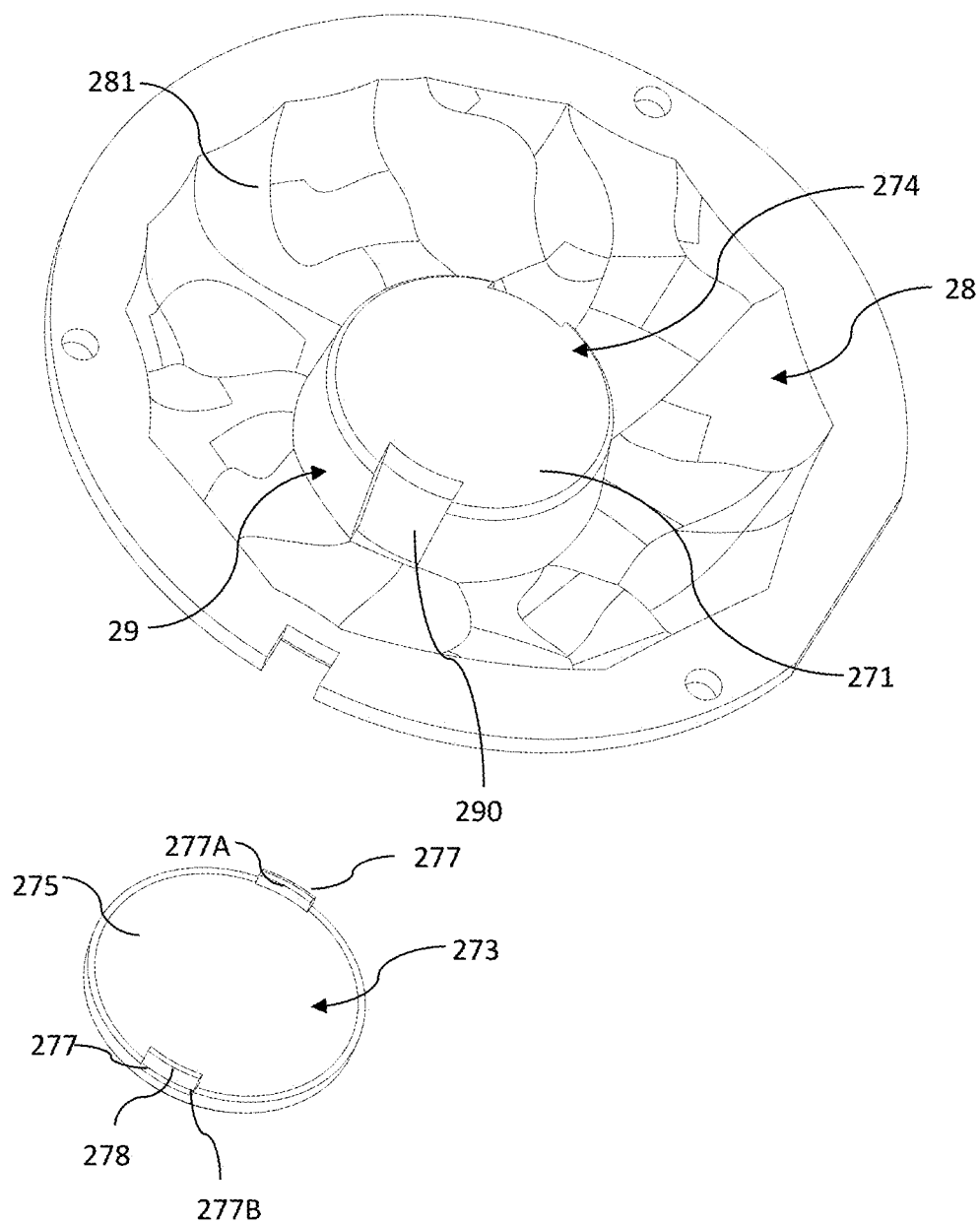
FIG. 11 is an exploded view of the first condenser lens of FIG. 6.

Referring to FIG. 10 to FIG. 11, in order to facilitate the installation of the first central lens portion 273, in this embodiment, the central lens portion 27 further includes an annular connection portion 29. One end of the annular connection portion 29 is connected to the second central lens portion 274, and the other end is connected to the wall of the central hole 283 of the peripheral lens portion 28. The first central lens portion 273 is assembled at the end of the annular connection portion 29 connected to the peripheral lens portion 28, that is, the first central lens portion 273 is accommodated in the central hole 283 of the peripheral lens portion 28.

Since the area of the first central lens portion 273 is larger than the area of the second central lens portion 274 as mentioned above, in this embodiment, the annular connection portion 29 has an approximately frustoconic shape in the axial direction, wherein the area of the end of the annular connection portion 29 connected to the second central lens portion 274 is smaller than the area of the end of the annular connection portion 29 connected to the peripheral lens portion 28.

Preferably, the annular connection portion 29, the second central lens portion 274, and the peripheral lens portion 28 are formed in one piece to increase their strength. It can be appreciated that, in other embodiments, the annular connection portion 29, the second central lens portion 274, and the peripheral lens portion 28 can be provided as separate pieces and then assembled together.

Preferably, the first central lens portion 273 is snap-connected with the peripheral lens portion 28. Specifically, one or more flexible snaps 277 are provided on the periphery of the first central lens portion 273, the annular connection portion 29 has one or more holes 290, and the one or more flexible snaps 277 are adapted to be engaged with the step of the peripheral lens portion 28 adjacent to the central hole 283 through the one or more holes 290. In this embodiment, two symmetrical flexible snaps 277 are disposed on the periphery of the first central lens portion 273. Correspondingly, two symmetrical holes 290 are defined in the annular connection portion 29. Each flexible snap 277 corresponds to a respective hole 290.

In order to improve the assembly stability of the first central lens portion 273, preferably, one end face of the annular connection portion 29 connected to the peripheral lens portion 28 at least partially protrudes radially inward relative to the peripheral lens portion 28 to form a support step 291, for supporting the outer periphery of the first central lens portion 273.

Further preferably, a wedge side 278 is defined on the outer surface of the flexible snap 277, which facilitates the first central lens portion 273 to be snapped with the peripheral lens portion 28 more smoothly. More preferably, the radially inner side 277A of the flexible snap 277 is fixedly connected to the first central lens portion 273, while the radially outer side 277B protrudes beyond the first central lens portion 273 so that the flexible snap 277 can be stably engaged with the step of the peripheral lens portion 28 adjacent to the central hole 283.

It can be appreciated that, in other embodiments, the first central lens portion 273 can be connected to the peripheral lens portion 28 in other ways, such as tight fitting, bonding, and the like. Alternatively, in other embodiments, the first central lens portion 273 can be mounted on the annular connection portion 29, instead of being directly connected to the peripheral lens portion 28. For example, the hole 290 may not penetrate through the annular connection portion 29, instead, being formed as a snap groove. In this case, it is only necessary to engage the flexible snap 277 on the first central lens portion 273 into the snap groove of the annular connection portion 29.

Figure 12:
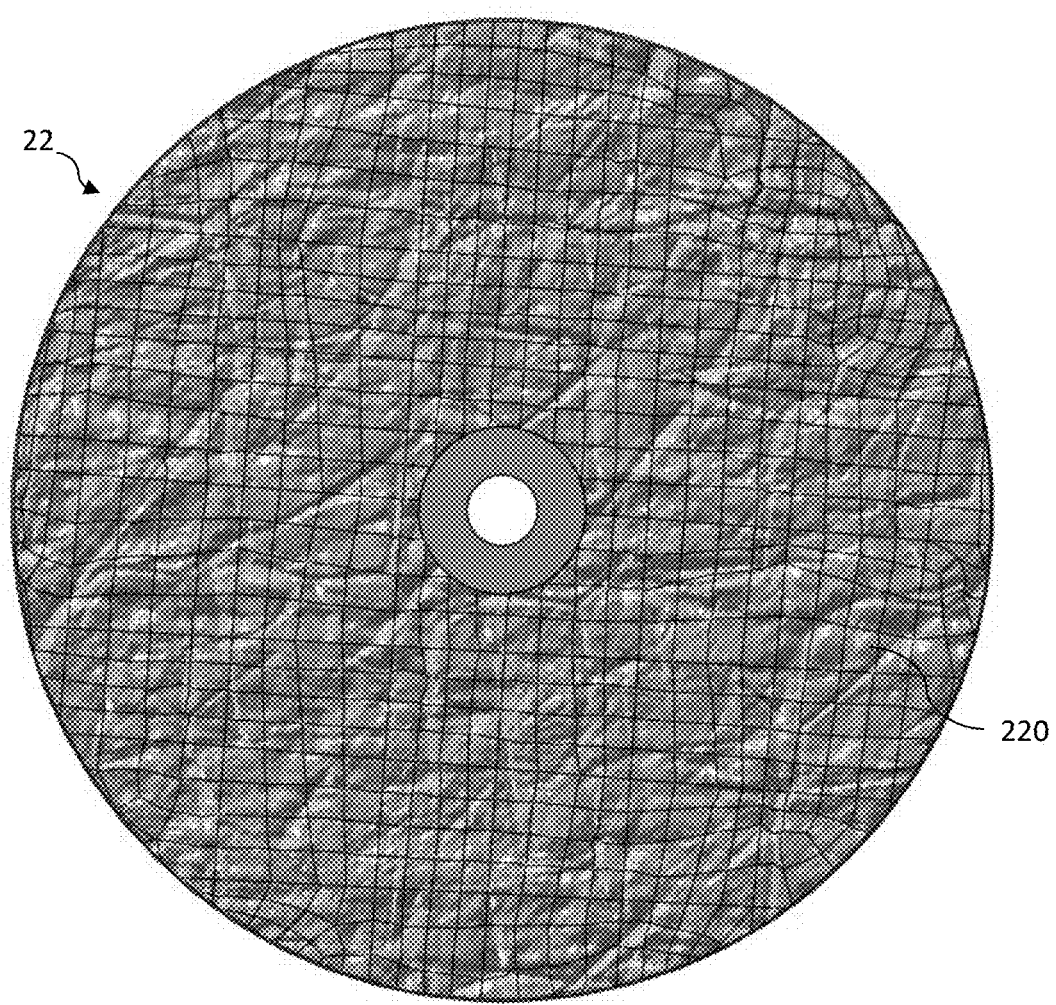
FIG. 12 is a top view of a refraction element of the first light-emitting component of FIG. 4.

Referring to FIG. 12, in this embodiment, one surface of the refraction element 22 is provided with a plurality of irregular second convex regions 220, and the opposite surface is smooth. In other words, the refraction element 22 in this embodiment includes a plurality of plano-convex lenses.

In this embodiment, the ratio of the height of at least part of the second convex regions 220 to the height of the refraction element 22 is in the range of $1/100$ to $1/3$, for example, in the range of $1/100$ to $1/5$, preferably in the range of $1/100$ to $1/10$, for example in the range of $1/100$ to $1/20$, or in the range of $1/50$ to $1/20$.

Alternatively or additionally, the height of the refraction element 22 is in the range of 0.5 mm to 5 mm, for example in the range of 1 mm to 5 mm, or in the range of 1 mm to 4 mm, or in the range of 2 mm to 4 mm, for example 3 mm.

Alternatively or additionally, the height of at least part of the second convex regions 220 is in the range of 0.01 mm to 1 mm, for example in the range of 0.01 mm to 0.5 mm, or in the range of 0.01 mm to 0.2 mm, or in the range of 0.01 mm to 0.1 mm, or in the range of 0.05 mm to 0.1 mm.

Preferably, at least some of the irregular second convex regions 220 are different in size. Alternatively or additionally, at least part of the second convex regions 220 has a maximum length in the range of 1 mm to 20 mm, for example in the range of 1 mm to 15 mm, or in the range of 1 mm to 10 mm, or in the range of 1 mm to 5 mm, or in the range of 2 mm to 5 mm.

Alternatively or additionally, at least part of the second convex regions 220 has a maximum width in the range of 0.1 mm to 5 mm, for example in the range of 0.1 mm to 3 mm, or in the range of 0.1 mm to 1 mm, or in the range of 0.5 mm to 2 mm, or in the range of 0.5 mm to 1 mm.

Further preferably, at least part of the irregular second convex regions 220 is different in shape. At least part of the second convex regions 220 is in the shape of an irregular water drop or a strip or a polygon, such as an irregular triangle or quadrilateral.

More preferably, as shown in FIG. 12, the plurality of irregular second convex regions 220 integrally form a rock-like face.

Figure 13:
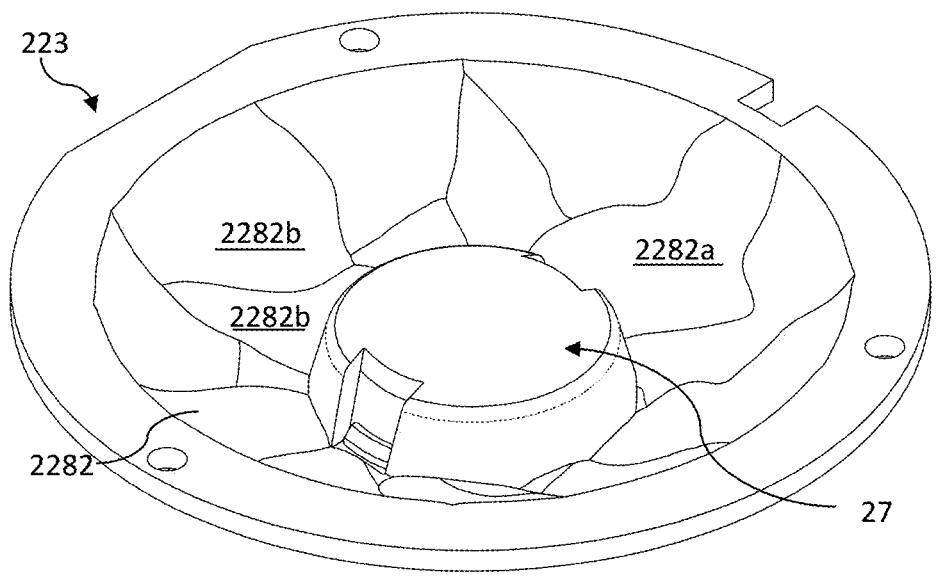
FIG. 13 is a schematic perspective view of a first condenser lens of a projection device according to a second embodiment of the present invention.

With reference to FIG. 13, the first condenser lens 223 according to the second embodiment of the present invention is substantially similar to the first condenser lens 23 according to the first embodiment, the main difference between the two is that the pattern formed by the plurality of irregular first convex regions 2282 on the first condenser lens 223 according to the present embodiment is different from the pattern formed by the plurality of irregular first convex regions 282 on the first condenser lens 23 according to the first embodiment. Similar to the first embodiment, no less than two-thirds of the plurality of irregular first convex regions 2282 on the first condenser lens 223 according to this embodiment are irregular strips, and the radial inner side of each irregular strip-shaped/elongated first convex region 2282a is adjacent to or close to the central lens portion 27, while the radial outer side extends to the outer periphery of the peripheral lens portion 28. However, part of the strip-shaped/elongated first convex regions 2282a in this embodiment is divided into less irregular first convex regions 2282b, resulting in the pattern formed by the plurality of irregular first convex regions 2282 in this embodiment more sparse.

Figure 14:
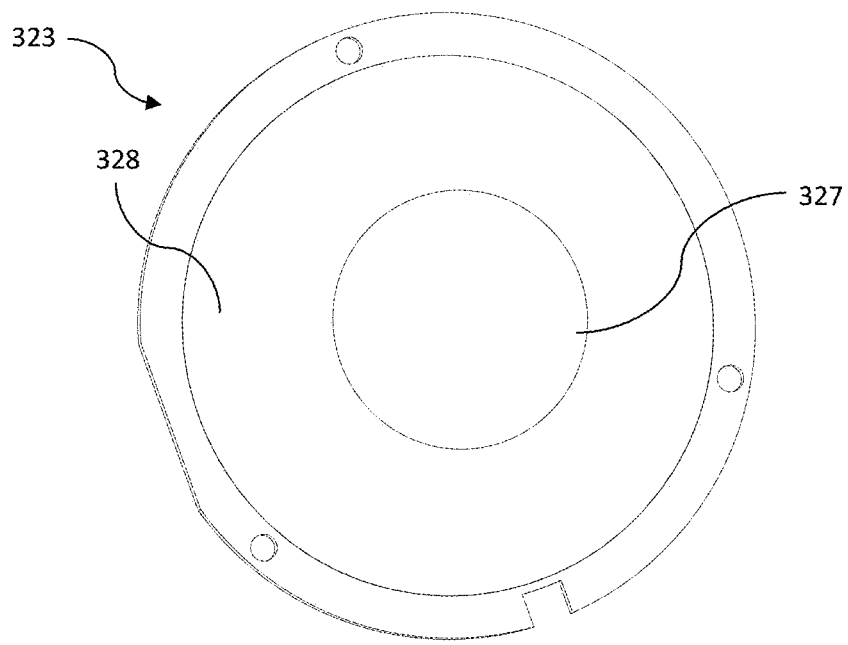
FIG. 14 is a schematic perspective view of a first condenser lens of a projection device according to a third embodiment of the present invention.
Figure 15:
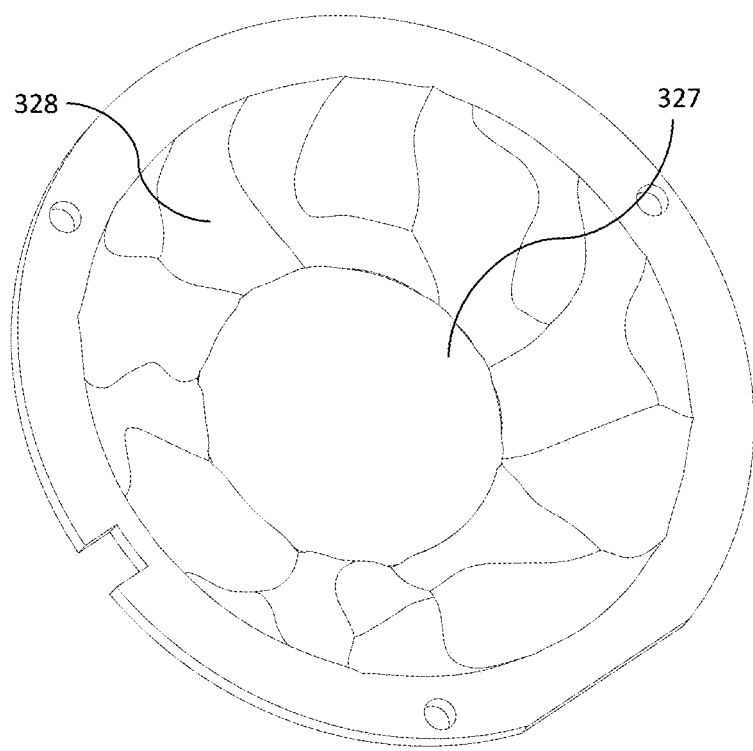
FIG. 15 is another perspective view of the first condenser lens of FIG. 14.

Referring to FIG. 14 and FIG. 15, the first condenser lens 323 according to the third embodiment of the present invention is substantially similar to the first condenser lens 223 of the aforementioned second embodiment, the main difference between the two is that the first condenser lens 323 according to this embodiment is formed in one piece. In other words, the central lens portion 327 and the peripheral lens portion 328 in this embodiment are no longer assembled together, but directly formed in one piece by means of, such as, injection molding. Similar to the second embodiment, both surfaces of the central lens portion 327 of the first condenser lens 323 of the present embodiment protrude relative to the corresponding surfaces of the peripheral lens portion 328, which can also shorten the focal length of the lens and reduce imaging distortion, making the image clearer. In this embodiment, the central lens portion 327 is roughly oblate. Optionally, the central lens portion 327 can be solid, or hollow, i.e., having the transition space 272.

Figure 16:
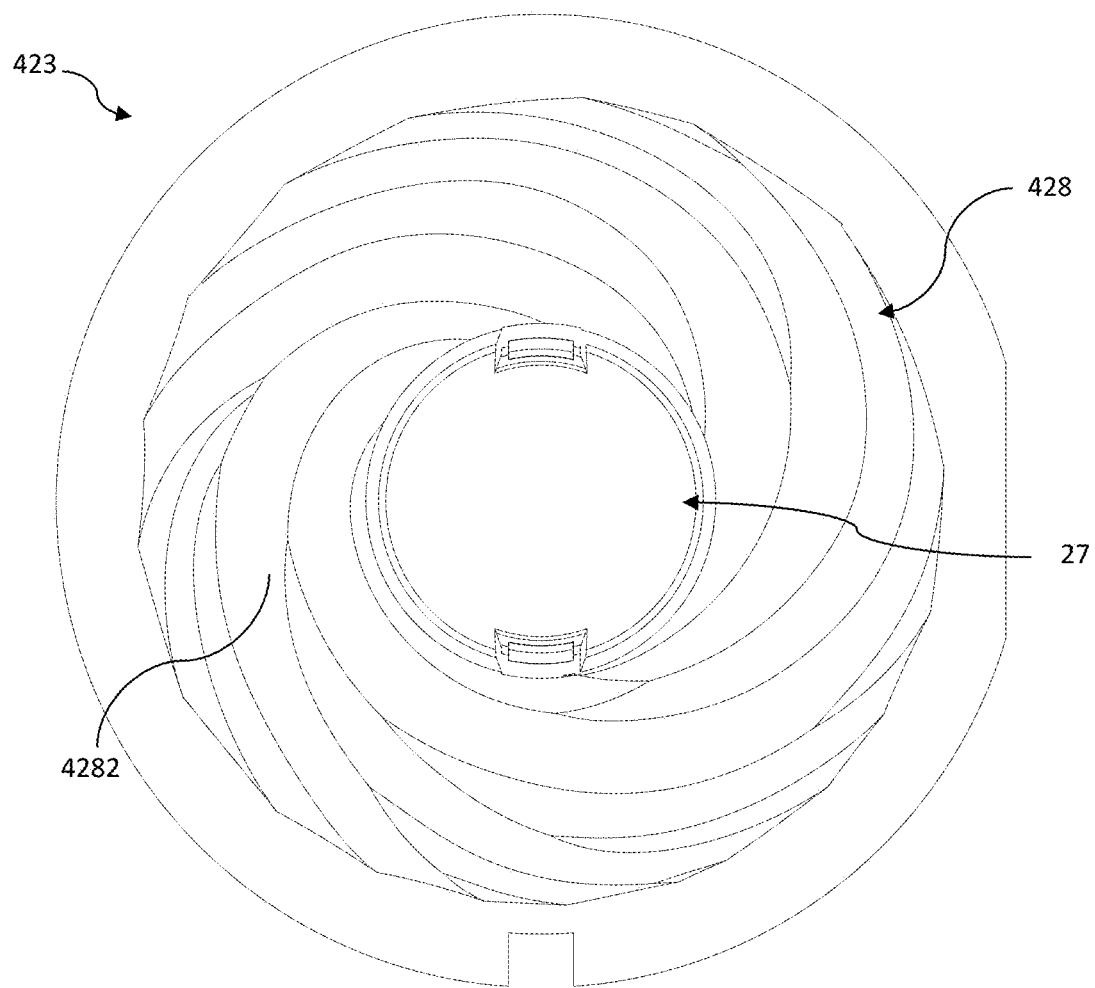
FIG. 16 is a schematic view of a first condenser lens of a projection device according to a fourth embodiment of the present invention.

Referring to FIG. 16, the first condenser lens 423 according to the fourth embodiment of the present invention is substantially similar to the first condenser lens 23 of the aforementioned first embodiment, the main difference between the two is that according to this embodiment the plurality of first convex regions 4282 on the peripheral lens portion 428 of the first condenser lens 423 are formed in a substantially spiral pattern. Specifically, the plurality of first convex regions 4282 extend outwards in a spiral shape around the central lens portion 27 toward the outer peripheral edge of the peripheral lens portion 428. The radial inner side of each first convex region 4282 is adjacent to or close to the central lens portion 27, the radial outer side extends to the outer peripheral edge of the peripheral lens portion 428, and the two circumferential sides are opposite to each other and roughly curved. It can be appreciated that, in other embodiments, depending on the desired imaging effect, the plurality of first convex regions on the peripheral lens portion of the first condenser lens can use other shapes and/or patterns, which will not be repeated here.

Figure 17:
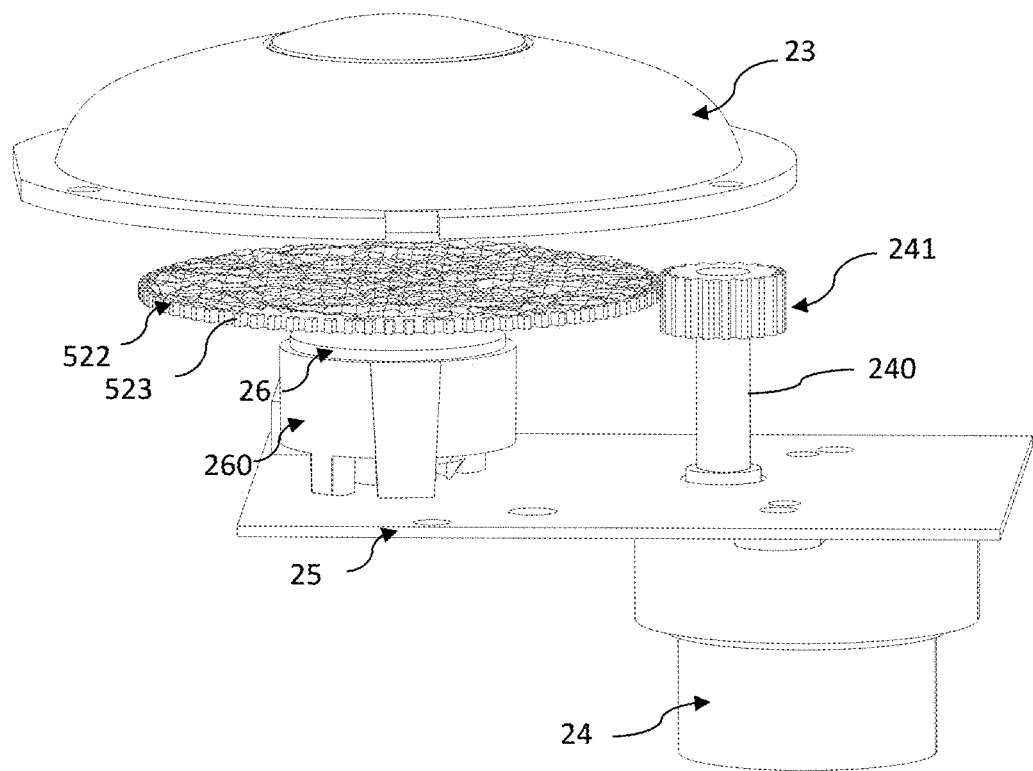
FIG. 17 is a schematic view showing the interior of a projection device according to a fifth embodiment of the present invention.

Referring to FIG. 17, the projection device according to the fifth embodiment of the present invention is similar to the projection device according to the fourth embodiment of the present invention, and the similarities therebetween would not be repeated here. The main distinction between the projection device according to the fifth embodiment and the projection device according to the fourth embodiment lies in the mechanism of the driving source driving the refraction element to rotate.

Specifically, as shown in FIG. 17, similar to the first embodiment, in this embodiment, the driving source 24 is also a motor. However, the output shaft 240 of the driving source 24 no longer passes through the middle of the refraction element 522 and directly connects with the middle of the refraction element 522 so as to drive the refraction element 522 to rotate. On the contrary, the output shaft 240 of the driving source 24 is provided with a gear 241, and the outer periphery of the refraction element 522 is provided with a plurality of teeth 523 which are engaged with the gear 241. When the driving source 24 works, the output shaft 240 rotates, and the gear 241 rotates with the output shaft 240, and since the plurality of teeth 523 are engaged with the gear 241, the refraction element 522 rotates about its own axis too, thereby achieving the similar effect as the first embodiment.

The above description is only preferred embodiments of the present invention, and the scope of protection of the present invention is not limited to the examples listed above. Simple changes or equivalents to the implementations made by any skilled person in the field within the scope disclosed in the present invention all fall within the protection scope of the present invention.

The invention claimed is:

1. An imaging lens, comprising a central lens portion and a peripheral lens portion arranged around the central lens portion, wherein the peripheral lens portion having a first outer surface and a first inner surface opposite to each other, and at least one of the first outer surface and the first inner surface having a plurality of first convex regions, and wherein the central lens portion having a second outer surface and a second inner surface opposite to each other, and at least one of the second outer surface and the second inner surface of the central lens portion protrudes beyond the corresponding first outer or inner surface of the peripheral lens portion, wherein a transition space is defined between the second outer surface and the second inner surface of the central lens portion, and wherein the central lens portion comprises a first central lens portion and a second central lens portion formed in separate pieces, and the transition space is defined between the first central lens portion and the second central lens portion, wherein the first central lens portion provides the second outer surface, and the second central lens portion provides the second inner surface.

2. The imaging lens of claim 1, wherein the first central lens portion and the second central lens portion are both circular, and the first central lens portion has an area larger than the second central lens portion.

3. The imaging lens of claim 1, wherein the peripheral lens portion has a central hole, and the central lens portion further includes an annular connection portion, one end of the annular connection portion is connected to the second central lens portion, and the other end is connected with a wall of the central hole of the peripheral lens portion, and the first central lens portion is arranged at the other end of the annular connection portion.

4. The imaging lens of claim 3, wherein the first central lens portion is snap-connected to the peripheral lens portion.

5. The imaging lens of claim 4, wherein one or more flexible snaps are provided on a periphery of the first central lens portion, and the annular connection portion has one or more holes, and wherein the one or more flexible snaps are adapted to be snapped to the peripheral lens portion through the one or more holes.

6. A projection device, comprising a first light-emitting component, the first light-emitting component includes a first light source, a refraction element, a first condenser lens, and a driving source, wherein the refraction element is located between the first light source and the first condenser lens so that light from the first light source can be directed by the refraction element to the first condenser lens when the first light source is powered, and wherein the first condenser lens comprising a central lens portion and a peripheral lens portion arranged around the central lens portion, wherein the peripheral lens portion having a first outer surface and a first inner surface opposite to each other, and at least one of the first outer surface and the first inner surface having a plurality of first convex regions, and wherein the central lens portion having a second outer surface and a second inner surface opposite to each other, and at least one of the second outer surface and the second inner surface of the central lens portion protrudes beyond the corresponding first outer or inner surface of the peripheral lens portion, and the driving source is configured to drive the refraction element to move.

7. The projection device of claim 6, wherein a plurality of irregular second convex regions are provided on the refraction element, and ratio of a height of at least part of the second convex regions to a height of the refraction element is in range of $1/100$ to $1/10$, or the height of at least part of the second convex regions is in range of 0.01 mm to 1 mm.

8. The projection device of claim 7, wherein at least part of the plurality of irregular second convex regions have different sizes, and the maximum length of at least part of the second convex regions is in range of to 1 mm to 20 mm, or the maximum width of at least part of the second convex regions is in range of 0.1 mm to 5 mm.

9. The projection device of claim 7, wherein at least part of the plurality of irregular second convex regions have different shapes, and at least part of the second convex regions are irregularly drop-shaped or strip-shaped or polygonal.

10. The projection device of claim 6, further comprising a housing and at least one leg for supporting the housing, and the housing is rotatably connected to the at least one leg, wherein the first light source, the refraction element, and the driving source are accommodated in the housing, the housing is provided with a first opening, and the first condenser lens is accommodated in the first opening and protrudes outside relative to the housing.

11. The projection device of claim 10, wherein the at least one leg includes two opposite legs, and the two opposite legs are respectively rotatably connected to two opposite sides of the housing.

12. The projection device of claim 10, further comprising at least one limiting member, each limiting members is located between one side of the housing and a corresponding leg, and is configured for fixing the housing at one or more angles relative to the leg.

13. The projection device of claim 12, wherein the limiting member is a rubber ring.

14. The projection device of claim 6, further comprising a second condenser lens which is located between the first light source and the refraction element, and the second condenser lens is located so that light from the first light source can be directed through the second condenser lens to the refraction element when the first light source is powered.

15. The projection device of claim 6, further comprising a second light-emitting component, the second light-emitting component includes a second light source and a diffraction element, and when the second light source is powered, light from the second light source is directed through the diffraction element.

16. The projection device of claim 15, wherein the first light source is an LED bead, and the second light source is a laser.

17. The projection device of claim 6, wherein the driving source comprises a motor, an output shaft of the motor passes through and connects with a middle of the refraction element so as to drive the refraction element to rotate, or the output shaft of the motor is connected with a gear, and an outer periphery of the refraction element is provided with a plurality of teeth, and the output shaft of the motor is configured to drive the refraction element to rotate through engagement between the gear and the plurality of teeth.

* * * * *